(12) United States Patent
Jang et al.

(10) Patent No.: US 11,636,698 B2
(45) Date of Patent: *Apr. 25, 2023

(54) IMAGE PROCESSING METHOD AND APPARATUS WITH NEURAL NETWORK ADJUSTMENT

(71) Applicant: SAMSUNG ELECTRONICS CO., LTD., Suwon-si (KR)

(72) Inventors: Cheolhun Jang, Pohang-si (KR); Dokwan Oh, Hwaseong-si (KR); Dae Hyun Ji, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 22 days.

This patent is subject to a terminal disclaimer.

(21) Appl. No.: 17/368,917

(22) Filed: Jul. 7, 2021

(65) Prior Publication Data

US 2021/0334609 A1   Oct. 28, 2021

Related U.S. Application Data

(63) Continuation of application No. 16/416,898, filed on May 20, 2019, now Pat. No. 11,087,185.

(30) Foreign Application Priority Data

May 25, 2018 (KR) .................. 10-2018-0059717

(51) Int. Cl.
  *G06V 30/194* (2022.01)
  *G06K 9/62* (2022.01)
  (Continued)

(52) U.S. Cl.
  CPC ......... *G06V 30/194* (2022.01); *G06K 9/6262* (2013.01); *G06N 3/082* (2013.01); *G06V 10/751* (2022.01); *G06V 20/56* (2022.01)

(58) Field of Classification Search
  CPC .... G06V 30/194; G06V 10/751; G06V 20/56; G06V 10/454; G06V 30/1916;
  (Continued)

(56) References Cited

U.S. PATENT DOCUMENTS

8,116,548 B2   2/2012 Zheng et al.
9,424,493 B2   8/2016 He et al.
(Continued)

FOREIGN PATENT DOCUMENTS

JP    4830401 B2     12/2011
JP    2015-130041 A   7/2015

OTHER PUBLICATIONS

Liang, Xuezhi, et al. "Soft-margin softmax for deep classification." International Conference on Neural Information Processing. Springer, Cham, 2017. (Year: 2017).*

(Continued)

*Primary Examiner* — Andrae S Allison
(74) *Attorney, Agent, or Firm* — NSIP Law

(57) ABSTRACT

A method and apparatus for adjusting a neural network that classifies a scene of an input image into at least one class is provided. The method generates a feature image having a size that is less than a size of an input image by applying a convolutional network to the input image, determines at least one class corresponding to the feature image, generates a class image having a size corresponding to the size of the input image by applying a deconvolutional network to the feature image, calculates a loss of the class image based on a verification class image preset with respect to the input image, and adjusts the neural network based on the loss.

17 Claims, 12 Drawing Sheets

(51) Int. Cl.
*G06N 3/08* (2023.01)
*G06V 10/75* (2022.01)
*G06V 20/56* (2022.01)
*G06N 3/082* (2023.01)

(58) Field of Classification Search
CPC .. G06V 10/82; G06V 30/19173; G06V 20/04; G06K 9/6262; G06N 3/082; G06N 3/0454; G06N 3/084; G06N 3/04
See application file for complete search history.

(56) References Cited

U.S. PATENT DOCUMENTS

| | | | |
|---|---|---|---|
| 9,554,142 | B2 | 1/2017 | Guerrero |
| 9,665,802 | B2 | 5/2017 | Wang et al. |
| 10,460,175 | B1* | 10/2019 | Gould ................ G06V 10/454 |
| 10,922,833 | B2* | 2/2021 | Croxford ................ G06T 7/60 |
| 2007/0230827 | A1 | 10/2007 | Haukijarvi et al. |
| 2010/0310159 | A1 | 12/2010 | Ranganathan |
| 2016/0042511 | A1 | 2/2016 | Chukka et al. |
| 2017/0085617 | A1 | 3/2017 | Bovik et al. |
| 2017/0337682 | A1 | 11/2017 | Liao et al. |
| 2017/0345181 | A1* | 11/2017 | Yu ........................ H04N 13/204 |
| 2017/0357896 | A1* | 12/2017 | Tsatsin .................. G06N 3/084 |
| 2017/0364798 | A1 | 12/2017 | Karlinsky et al. |
| 2018/0121762 | A1* | 5/2018 | Han ........................ G06K 9/627 |
| 2018/0336683 | A1 | 11/2018 | Feng et al. |
| 2019/0034762 | A1* | 1/2019 | Hashimoto .......... G06N 3/0454 |
| 2019/0079534 | A1 | 3/2019 | Zhu et al. |
| 2019/0156204 | A1 | 5/2019 | Bresch et al. |
| 2019/0279293 | A1* | 9/2019 | Tang ........................ G06N 3/084 |
| 2020/0134833 | A1* | 4/2020 | Biswas ................ G06V 10/267 |

OTHER PUBLICATIONS

Q. Zhu, P. Zhang, Z. Wang and X. Ye, "A New Loss Function for CNN Classifier Based on Predefined Evenly-Distributed Class Centroids," in IEEE Access, vol. 8, pp. 10888-10895, 2020, doi: 10.1109/ACCESS.2019.2960065. (Year: 2019).*

Liu, Weiyang, et al., "Large-margin softmax loss for convolutional neural networks." ICML. vol. 2. No. 3. 2016 (Year: 2016).

* cited by examiner

FIG. 1
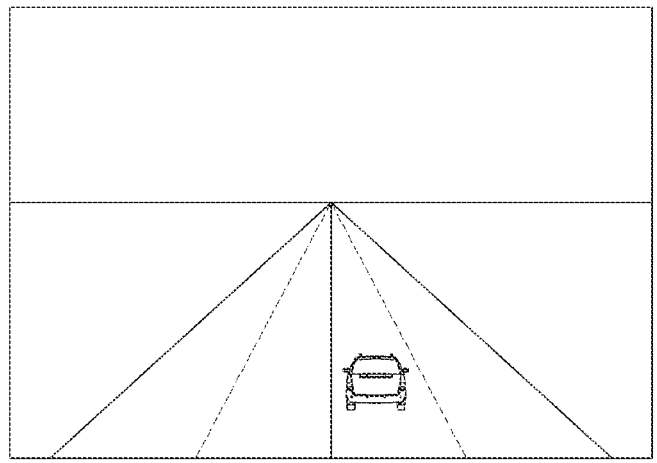
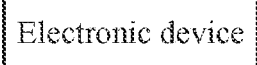
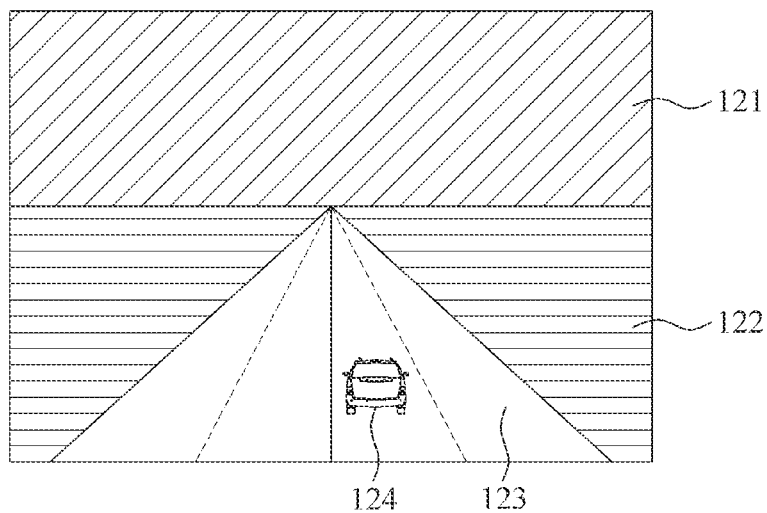

FIG. 11
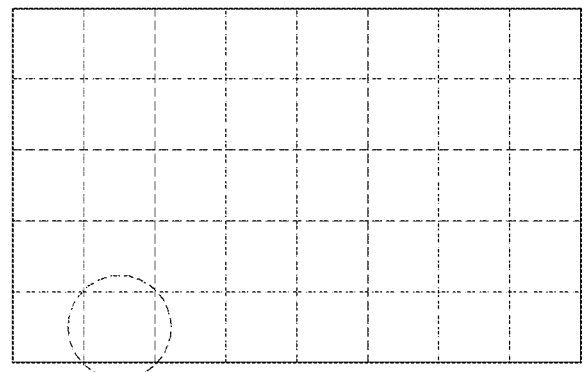
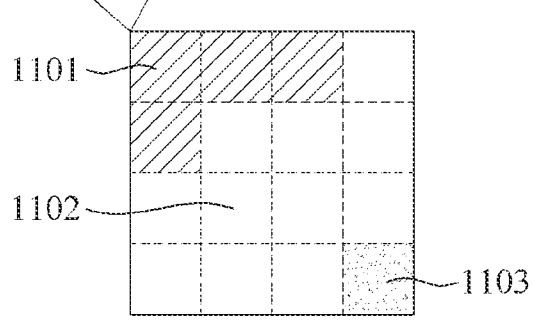
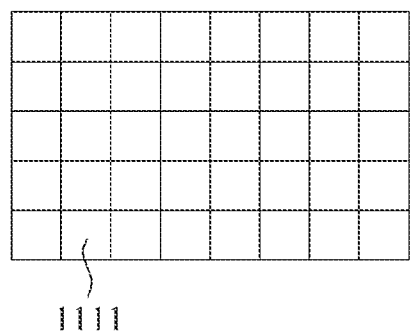

IMAGE PROCESSING METHOD AND APPARATUS WITH NEURAL NETWORK ADJUSTMENT

CROSS-REFERENCE TO RELATED APPLICATIONS

This application is a Continuation Application of U.S. patent application Ser. No. 16/416,898, filed on May 20, 2019, which claims the benefit under 35 USC § 119(a) of Korean Patent Application No. 10-2018-0059717 filed on May 25, 2018 in the Korean Intellectual Property Office, the entire disclosure of which is incorporated herein by reference for all purposes.

BACKGROUND

1. Field

The following description relates to a method and apparatus with network adjustment for processing an image.

2. Description of Related Art

Classification technology is technology that verifies whether a specific object is present in an image. Detection technology, unlike classification technology, includes location information of the specific object and verifies whether the specific object is present in the image and the location of the specific object in the image. Thus, in response to an object, a scene, and the like being included in an image, detection technology is used for verifying the object and the scene in the image and detecting locations of the object and the scene in the image.

Scene segmentation using detection technology is technology that detects a class in which a pixel in an image is included. For example, such technology may be used to determine whether the pixel is included in, or related to a vehicle or a road. The detected locations of the scene and the object in the image may be used in various fields.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented neural network adjustment method includes generating a feature image having a size that is less than a size of an input image by applying the input image to a convolutional network, determining at least one class corresponding to the feature image, generating a class image having a size corresponding to the size of the input image by applying the feature image to a deconvolutional network, calculating a loss of the class image based on a verification class image preset with respect to the input image, and adjusting the neural network based on the loss.

The neural network may include the convolutional network and the deconvolutional network.

The adjusting of the neural network may include calculating a main loss between the verification class image and the class image, calculating an auxiliary loss based on the verification class image and the feature image, and adjusting the neural network based on the calculated main loss and the calculated auxiliary loss.

The calculating of the auxiliary loss may include generating a reduced verification class image by reducing a size of the verification class image based on a size of the feature image, generating an auxiliary class image based on the feature image, and calculating the auxiliary loss based on the reduced verification class image and the auxiliary class image.

The generating of the reduced verification class image may include dividing the verification class image into a plurality of blocks, each of the plurality of blocks having a preset size, determining a representative class of a target block, and generating the reduced verification class image based on the representative class.

The determining of the representative class may include determining a mode class in the target block as the representative class.

Subsequent to a final operation of the neural network to generate a resulting trained neural network, the trained neural network is configured to process an image captured by a camera included in a vehicle to generate a final class image with a predetermined accuracy.

The method may further include stopping an adjustment of the neural network in response to the calculated loss being less than a preset threshold value.

In a general aspect, a neural network apparatus includes a processor, and a memory storing instructions that when implemented by the processor, wherein, when the instruction is executed by the processor, the processor is configured to generate a feature image having a size that is less than a size of an input image by applying a convolutional network to the input image, determine at least one class corresponding to the feature image, generate a class image having a size corresponding to the size of the input image by applying a deconvolutional network to the feature image, calculate a loss of the class image based on a verification class image preset with respect to the input image, and adjust the neural network based on the loss.

The neural network may include the convolutional network and the deconvolutional network.

The adjusting of the neural network may include calculating a main loss between the verification class image and the class image, calculating an auxiliary loss based on the verification class image and the feature image, and adjusting the neural network based on the calculated main loss and the calculated auxiliary loss.

The calculating of the auxiliary loss may include generating a reduced verification class image by reducing a size of the verification class image based on a size of the feature image, generating an auxiliary class image based on the feature image, and calculating the auxiliary loss based on the reduced verification class image and the auxiliary class image.

The generating of the reduced verification class image may include dividing the verification class image into a plurality of blocks, each of the plurality of blocks having a preset size, determining a representative class of a target block, and generating the reduced verification class image based on the representative class.

The determining of the representative class may include determining a mode class in the target block as the representative class.

The neural network may be configured to process an image captured by a camera included in a vehicle.

The program may be further configured to stop an adjustment of the neural network in response to the calculated loss being less than a preset threshold value.

Other features and aspects will be apparent from the following detailed description, the drawings, and the claims.

BRIEF DESCRIPTION OF THE DRAWINGS

FIG. 1 illustrates an example of a class image generated based on an input image, in accordance with one or more embodiments;

FIG. 11 illustrates an example of a reduced verification class image, in accordance with one or more embodiments.

Figure 2:
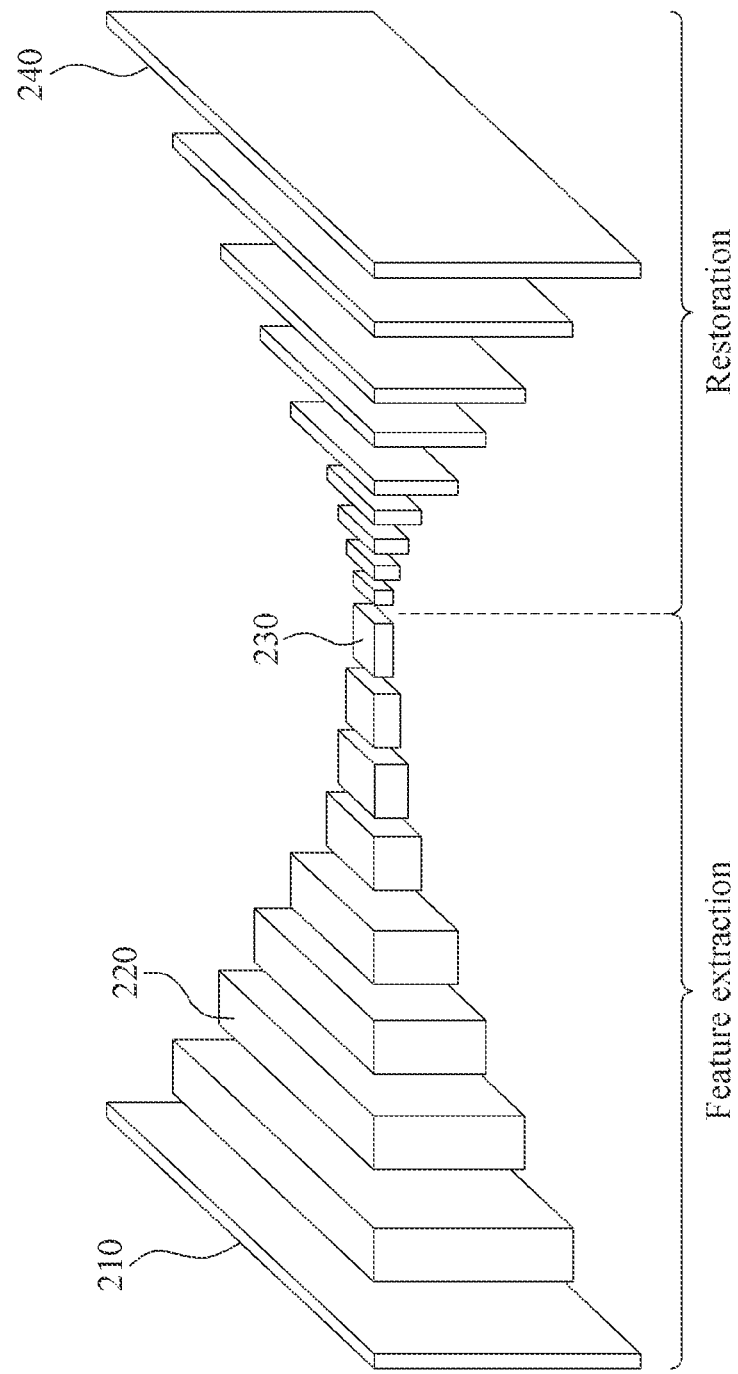
FIG. 2 illustrates an example of a structure of a network for generating a class image, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Additionally, in the description of examples, like reference numerals refer to like elements throughout the disclosure of this application, and repeated description related thereto is omitted. Further, detailed description of well-known related structures or functions will be omitted when it is deemed that such description will cause ambiguous interpretation of the present disclosure.

FIG. 1 illustrates an example of a class image generated based on an input image in accordance with one or more embodiments.

Recently, various image processing methods that assist a driver in a vehicle have been developed. In an example, in response to the vehicle being an autonomous vehicle, an image captured using a camera included in the vehicle may be used to generate an autonomous driving path of the vehicle. Here, to generate the autonomous driving path, a scene and an object present in the image may have to be classified.

In one or more embodiments, an electronic device 110 included in the vehicle may not directly detect a feature of the image 100 based on an unprocessed version of the input image 100. The electronic device 110 may use a network to detect information or the feature included in the image 100. In an example, the network may receive a plurality of inputs, and may output a result based on parameters of the network applied to each input. The network may be a neural network, however, it is provided as an example only. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto Referring to FIG. 1, in response to the image 100 including the sky, the ground, a road, and a vehicle being input into the electronic device 110, the electronic device 110 outputs a class image 120 as a result. The electronic device 110 may detect the sky, the ground, and the road that are included in the image 100 as a scene, as well as the vehicle as an object within the image. The detected scene (the sky, the ground, and the road) and detected object (the car) may be defined as respective corresponding classes. The electronic device 110 may divide the image 100 into respective regions of the detected sky, ground, road, and vehicle, and output the class image 120 in which the regions are distinguishably represented. A first region 121 corresponds to the sky, a second region 122 corresponds to the ground, a third region 123 corresponds to the road, and a fourth region 124 corresponds to the vehicle.

As non-limiting examples, a user may train the network implemented by the electronic device 110, so that the class image 120 to be output by the image 100 is similar to an actual or training result, pre-matched to the image 100. For example, the network may be a neural network. The neural network may be a deep neural network (DNN), as a non-limiting example. In such an example, the DNN may be one or more of a fully connected network, a deep convolutional network, and/or a recurrent neural network, or may include different or overlapping neural network portions respectively with such full, convolutional, or recurrent connections. The neural network may be configured to perform, as non-limiting examples, object classification, object recognition, and image recognition by mutually mapping input data and output data in a nonlinear relationship based on deep learning. Such deep learning is indicative of processor implemented machine learning schemes for solving issues, such as issues related to automated image recognition from a big data set, as a non-limiting example. The deep learning may be implemented by mapping of input data and the output data through supervised or unsupervised learning or training, such that when trained the resultant machine learning model, engine, or example neural network may intuitively map unknown input data to output data with a desired accuracy or reliability The network may be trained through backpropagation as only an example. For example, in response to the network including a plurality of layers connected through nodes, the network may be trained by iteratively adjusting the respective connection weighting between nodes. In the training, such example connection weightings between nodes of different hidden layers, for example, may be recursively adjusted until the corresponding neural network model is trained with a desired accuracy rate or below a maximum error rate, for example. For example, in response to a cost function being defined, a gradient-descent method may be used to ultimately find a minimum value of the cost function during the training. However, it is provided as an example only.

FIG. 2 illustrates an example of a structure of a network for generating a class image, in accordance with one or more embodiments.

In response to an input image 210 being input into a network, a class image 240 is generated as an output. The class image 240 in which classified classes are distinguished from other regions is output. For example, the network may be a neural network. The neural network includes a fully convolutional network (FCN). However, it is provided as a non-limiting example only. The neural network may be used to classify a scene of the input image 210 into at least one class. That is, the neural network may be used for a scene segmentation. To detect the scene, the neural network may include one or more feature extractors configured to extract features of the input image 210, and a restorer configured to generate the class image 240.

A first feature image 220 is generated based on the input image 210, and a final feature image 230 is generated based on the first feature image 220. The final feature image 230 is input into fully connected layers, and the at least one class corresponding to the final feature image 230 is output as a result.

The class image 240 is generated based on the final feature image 230. A size of the class image 240 corresponds to a size of the input image 210, such as a pixel of the class image 240 corresponding to a pixel of the input image 210, and coordinates of pixels of the input image 210 being identical to corresponding coordinates of the pixels of the image 240. That is, a first pixel of the class image 240 indicates a class of a first pixel of the input image 210 located at coordinates identical to coordinates of the first pixel of the class image 240.

While the input image 210 may have the same size or dimensions of the class image 240, examples are non-limiting thereto In response to a classification of classes included in the class image 240 differing from an actual classification, a user may train the neural network. For example, the user may provide a ground truth (GT) value to a training device and the training device may train the neural network, so that a result output through the neural network may follow the provided GT value. Substantially, training the neural network may indicate adjusting values allocated to a layer and a node that are included in the neural network.

Hereinafter, a method of adjusting a neural network will be described with reference to FIGS. 3 through 12.

Figure 3:
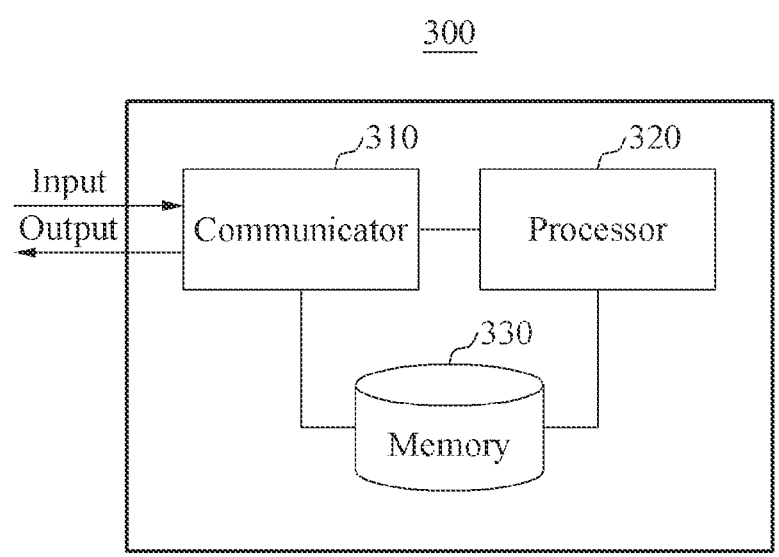
FIG. 3 illustrates an example of a neural network adjustment apparatus, in accordance with one or more embodiments.

FIG. 3 illustrates an example of a neural network adjustment apparatus, in accordance with one or more embodiments.

Referring to FIG. 3, a neural network adjustment apparatus 300 includes a communicator 310, a processor 320, and a memory 330. In an example, the neural network adjustment apparatus 300 may be a server, which is an electronic device, or a mobile device. However, a type and a function of the neural network adjustment apparatus 300 are not limited thereto. The neural network adjustment apparatus 300 may be the aforementioned training device of FIG. 2.

The neural network adjustment apparatus 300 may be a vehicle and processor configured to execute instructions to implement the trained neural network with respect to images captured by the vehicle, and displaying the generated real-world class image.

The communicator 310 connects to the processor 320 and the memory 330, and may transmit or receive data. Additionally, the communicator 310 connects to an external device, and may transmit and/or receive data.

The communicator 310 is provided as a circuitry in the neural network adjustment apparatus 300. For example, the communicator 310 may include an internal bus and an external bus. As another example, the communicator 310 may be a hardware element that connects the neural network adjustment apparatus 300 and the external device. The communicator 310 may be a network or input/output (I/O) interface. The communicator 310 may receive data from the external device and transmit the data to the processor 320 and the memory 330.

The processor 320 processes the data received by the communicator 310 and the data stored in the memory 330. The term "processor" used herein may be a data processing device implemented using hardware components that include a circuit having a physical structure to implement operations. For example, the operations may be implemented by execution codes or instructions, e.g., included in a program, by the data processing device. For example, the data processing device implemented using hardware components may include a microprocessor, a central processing unit (CPU), a processor core, a multi-core processor, a multiprocessor, an application-specific integrated circuit (ASIC), a field programmable gate array (FPGA), and the like.

The processor 320 executes computer-readable codes, for example, software, stored in a memory, for example, the memory 330, and instructions caused by the processor 320 execution of those computer-readable codes.

The memory 330 stores the data received by the communicator 310 and the data processed by the processor 320. For example, the memory 330 stores a program. The program to be stored may be a set of syntaxes that are coded to adjust a neural network and thereby are executable by the processor 320. The memory 330 may also store the parameters of the neural network, e.g., initialized parameters and/or intermediate parameters generated during the training.

In an example, the memory 330 includes at least one volatile memory, non-volatile memory, random access memory (RAM), flash memory, hard disk drive (HDD), and optical disk drive (ODD).

The memory 330 stores an instruction set, for example, software, that operates the neural network adjustment apparatus 300. The instruction set that operates the neural network apparatus 300 is executed by the processor 320.

Non-limiting examples of the communicator 310, the processor 320, and the memory 330 will be described below with reference to FIGS. 4 through 12.

Figure 4:
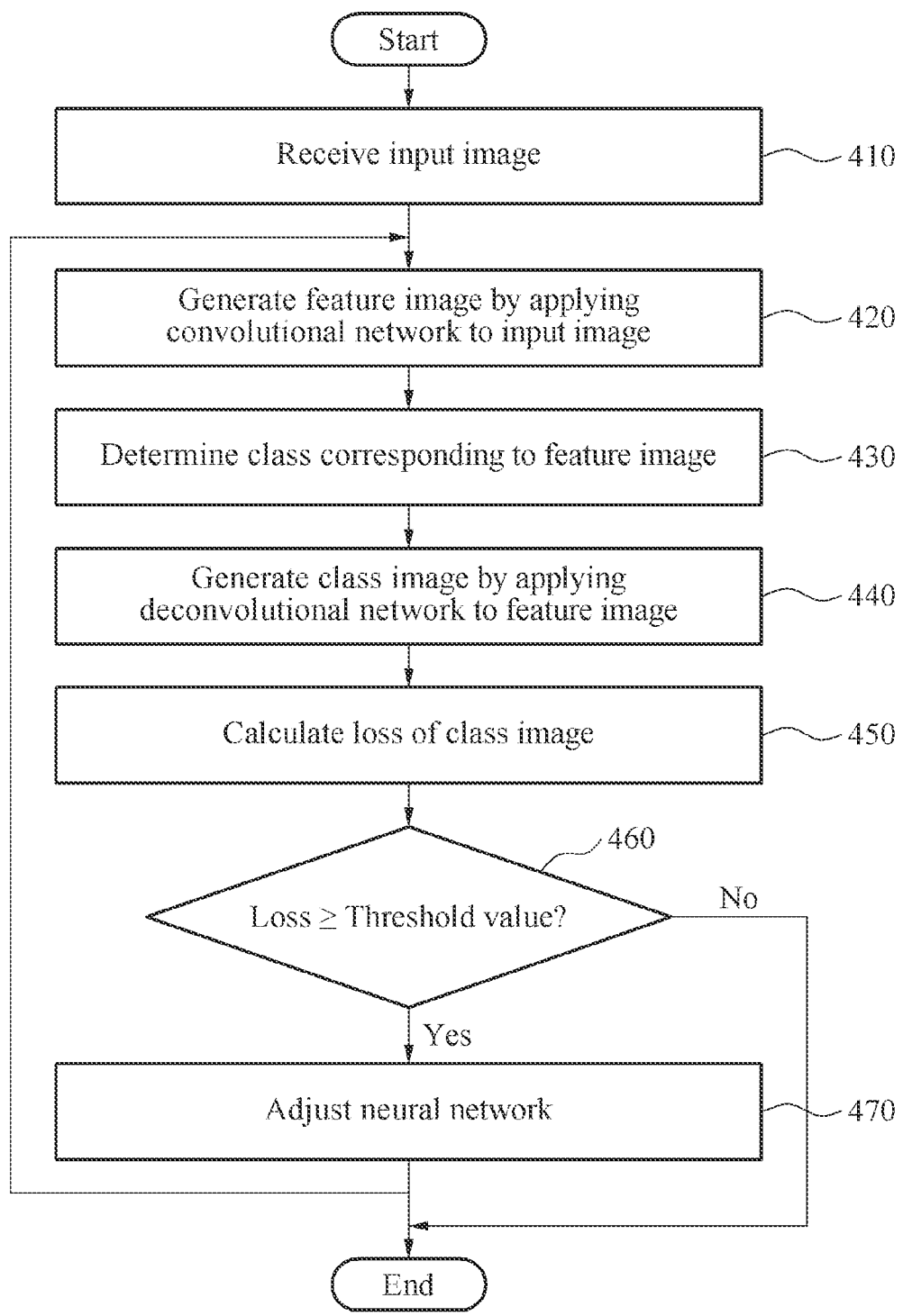
FIG. 4 is a flowchart illustrating an example of a method of adjusting a neural network, in accordance with one or more embodiments.

FIG. 4 is a flowchart illustrating an example of a method of adjusting a neural network. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more or all blocks of FIG. 4, and combinations of the blocks, can be implemented by special purpose hardware-based computer that perform the specified functions, or combinations of special purpose hardware and computer coding or program. In addition to the description of FIG. 4 below, the descriptions of FIGS. 1-3 are also applicable to FIG. 4, and are incorporated herein by reference. Thus, the above description may not be repeated here.

Operations 410 through 470 of FIG. 4 may be performed by the neural network adjustment apparatus 300 of FIG. 3. A neural network includes a convolutional network and a deconvolutional network as non-limiting examples. For example, the convolutional network may be the feature extractor of FIG. 2, and the deconvolutional network may be the restorer of FIG. 2. The convolutional network and the deconvolutional network may be symmetrical to each other, however, it is provided as an example only.

Referring to FIG. 4, in operation 410, the neural network adjustment apparatus 300 receives an input image. For example, a user inputs a sample image to be used for training as the input image into the neural network adjustment apparatus 300.

In operation 420, the neural network adjustment apparatus 300 generates a feature image by applying the convolutional network to the input image. For example, the neural network adjustment apparatus 300 generates the feature image using one or more convolutional layers. A plurality of feature images may be generated. For example, respective feature images with respect to a red (R) channel, a green (G) channel, and a blue (B) channel may be generated by use of respective convolutional layers or by use of respective weight kernels and the convolutional layer, as a non-limiting example. The feature image may be the first feature image 220 or the final feature image 230 as illustrated in FIG. 2.

Detecting a specific object and a specific scene in the input image may include determining respective locations at which the specific object and the specific scene are present in the image, in addition to the determining of whether the specific object and the specific scene are present. Thus, the feature image to be generated may include location information on the specific object and the specific scene through a quadrangular region, which is called a bounding box. The location information may include from which pixels of the input image a pixel of the feature image originates.

A method of generating a feature image will be described below with reference to FIGS. 5 and 6.

In operation 430, the neural network adjustment apparatus 300 determines at least one class corresponding to the feature image. For example, the neural network adjustment apparatus 300 may determine the class corresponding to the feature image through a softmax layer following feed forward layers following the convolutional layer.

The neural network adjustment apparatus 300 determines location information on the determined class through the determined bounding box. For example, the neural network adjustment apparatus 300 determines the location information on the class through a bounding box regressor.

In operation 440, the neural network adjustment apparatus 300 generates a class image by applying the deconvolutional network to the feature image. For example, the deconvolutional network generates the class image using a deconvolution filter. A size of the generated class image may correspond to a size of the input image, as a non-limiting example.

In operation 450, the neural network adjustment apparatus 300 calculates a loss of the class image using a verification class image preset with respect to the input image. The verification class image is an image in which a class of the input image is expressed as a GT value. That is, the verification class image may be a reference value. The loss of the class image may be a value that numerically expresses a difference between the class image and the verification class image. According to a decrease in an error, the loss decreases. The loss may be calculated based on a sum of differences calculated for each pixel of the class image, as a non-limiting example.

In operation 460, the neural network adjustment apparatus 300 determines whether the calculated loss is less than a preset threshold value. In response to the loss being less than the threshold value, adjustment of a neural network is terminated.

In an example, in response to a number of iterations the adjustment of the neural network is performed being greater than the preset threshold value, the adjustment and training of the neural network is terminated.

In operation 470, the neural network adjustment apparatus 300 adjusts the neural network based on the loss. Parameters of at least one of the convolutional network and the deconvolutional network may be adjusted. In an example, the adjustment of the neural network may refer to changing or iteratively adjusting weights of nodes that connect layers included in the neural network, and/or may refer to changing or iteratively adjusting respective weights of the convolutional filter(s) (kernel(s)) and the deconvolution filter (kernel(s)).

For example, a neural network of which an adjustment, and thus training, is completed is referred herein as a trained neural network, and may be used for processing an image captured by a camera included in a vehicle that stores and implements the trained neural network in an embodiment. In such an embodiment, the vehicle is an autonomous vehicle and uses the trained neural network to generate an autonomous driving path.

A method of adjusting a neural network will be described below with reference to FIGS. 7 through 11.

Figure 5:
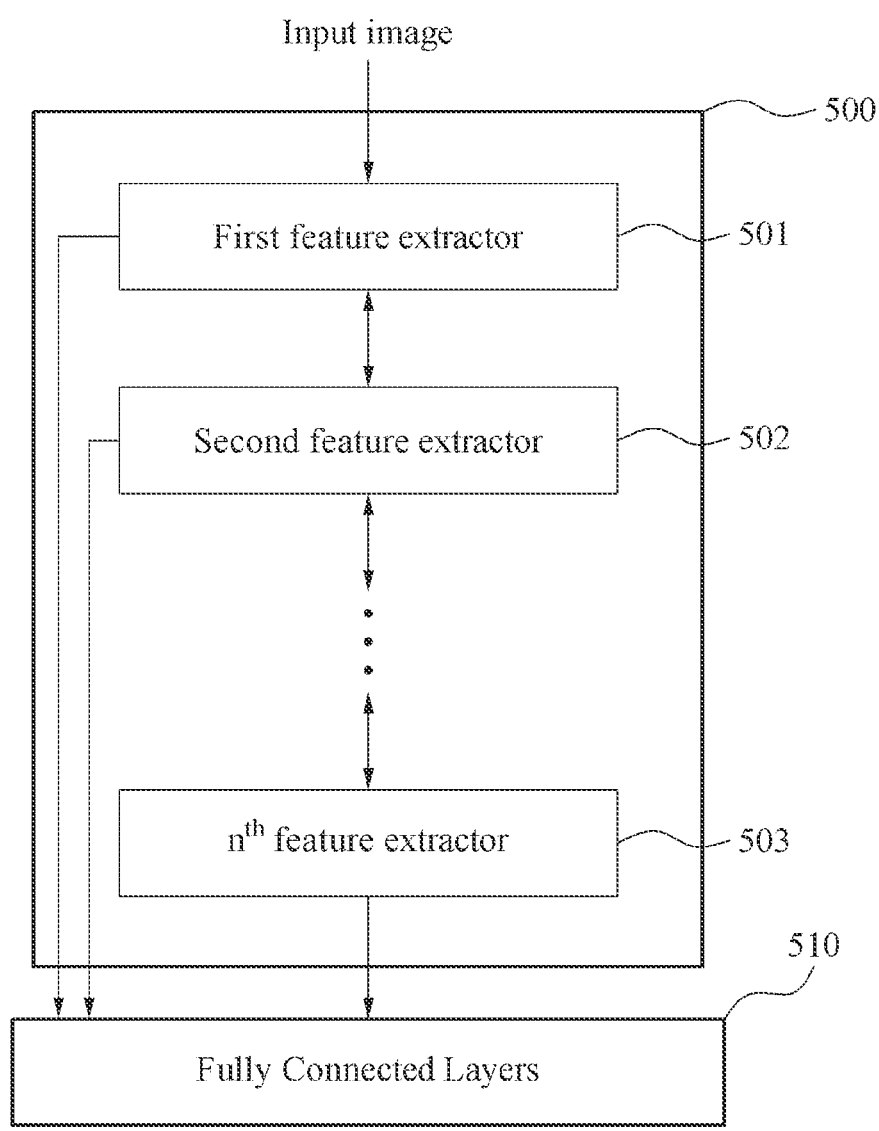
FIG. 5 illustrates an example of a structure of a convolutional network, in accordance with one or more embodiments.

FIG. 5 illustrates an example of a structure of a convolutional network, in accordance with one or more embodiments.

In an example, a convolutional network may be a convolutional neural network (CNN). The CNN is a multi-layer neural network having a connection structure, e.g., designed for an image processing.

Referring to FIG. 5, the convolutional network includes a feature extractor 500 and fully connected layers 510. The feature extractor 500 includes a plurality of extractors, for example, a first feature extractor 501, a second feature extractor 502, and an $n^{th}$ feature extractor 503, and the plurality of extractors, for example, the first feature extractor 501, the second feature extractor 502, and the $n^{th}$ feature extractor 503, are connected to the fully connected layers 510. A number of the plurality of feature extractors, for example, the first feature extractor 501, the second feature extractor 502, and the $n^{th}$ feature extractor 503, included in the feature extractor 500 may vary based on a size of an input image, for example. The first feature extractor 501, the second feature extractor 502, and the $n^{th}$ feature extractor 503 will be further described with reference to FIG. 6.

Figure 6:
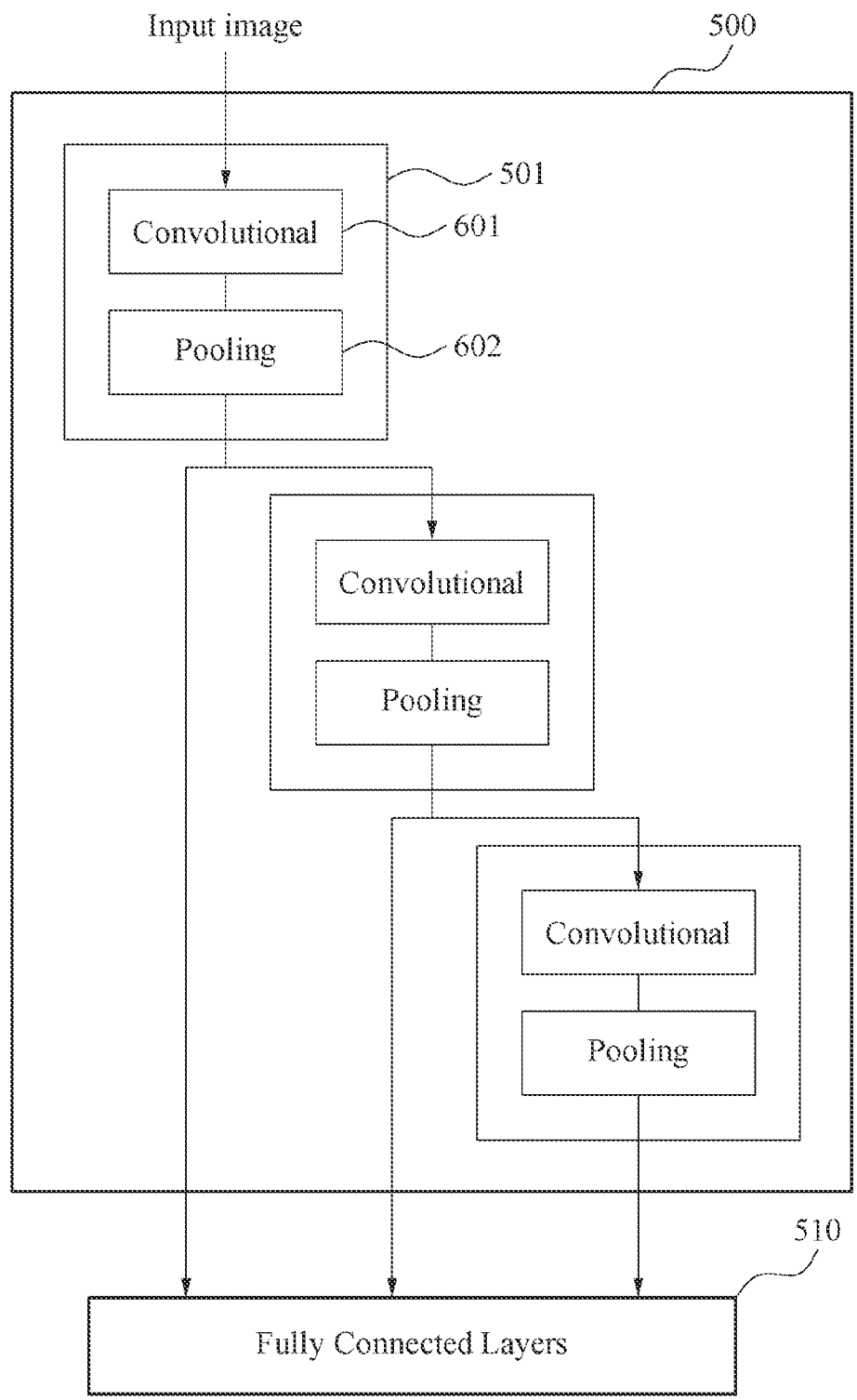
FIG. 6 illustrates an example of a structure of a neural network including a convolutional layer and a pooling layer, in accordance with one or more embodiments.

FIG. 6 illustrates an example of a structure of a neural network including a convolutional layer and a pooling layer, in accordance with one or more embodiments.

Referring to FIG. 6, the first feature extractor 501 includes a convolutional layer 601 and a pooling layer 602. The pooling layer may also be referred to as a subsampling layer.

The convolutional layer 601 generates a feature map by applying various weight kernels to an input image. The convolutional layer 601 includes such a weight filter and an activation function configured to transform a result value of the convolutional application of the weight filter to the input image, to a non-linear value.

In an example, each of plural convolutional layers included in the plurality of feature extractors, for example, the first feature extractor 501, the second feature extractor 502, and the $n^{th}$ feature extractor 503, may be designed or pre-trained (for example) for a specific purpose. For example, the convolutional layer 601 filters a predetermined (or, alternatively, desired) edge. A plurality of feature maps corresponding to a number of convolutional filters included in the convolutional layer 601 may be generated.

The pooling layer 602 generates a feature image by reducing a resolution of the generated feature map. For example, the pooling layer 602 reduces the resolution of the feature map using a pooling, for example, a max pooling, an average pooling, and the like. Also, when plural weight kernels are applied in convolutional layer 601 corresponding to plural feature maps will be generated, a feature image, each of which may also be respectively generated through the pooling.

For example, come nodes between the convolutional layer 601 and the pooling layer 602 may be partially connected, and a connection weight may be shared between those nodes.

A filter of a convolutional layer included in the second feature extractor 502 filters a complex edge compared to the convolutional filter of the convolutional layer 601 included in the first feature extractor 501. A pooling layer included in the second feature extractor 502 extracts a representative value from the feature image filtered by the convolutional layer of the second feature extractor 502 using the pooling.

The fully connected layers 510 may be a recognizer or classifier that recognizes at least one class corresponding to the feature image. Nodes included in the fully connected layers 510 may be fully connected, and connection weights between nodes of each layer may be individually set in the training.

The fully connected layers 510 generate a feature vector based on values corresponding to entire nodes of layers included in the feature extractor 500. The feature vector may be a class. The feature vector may also represent probabilistic information of all potential classifiable classes.

A configuration of a layer, an activation model, and a related algorithm described above with reference to FIGS. 5 and 6 may be variously modified based on a type of data and an operation purpose.

Figure 7:
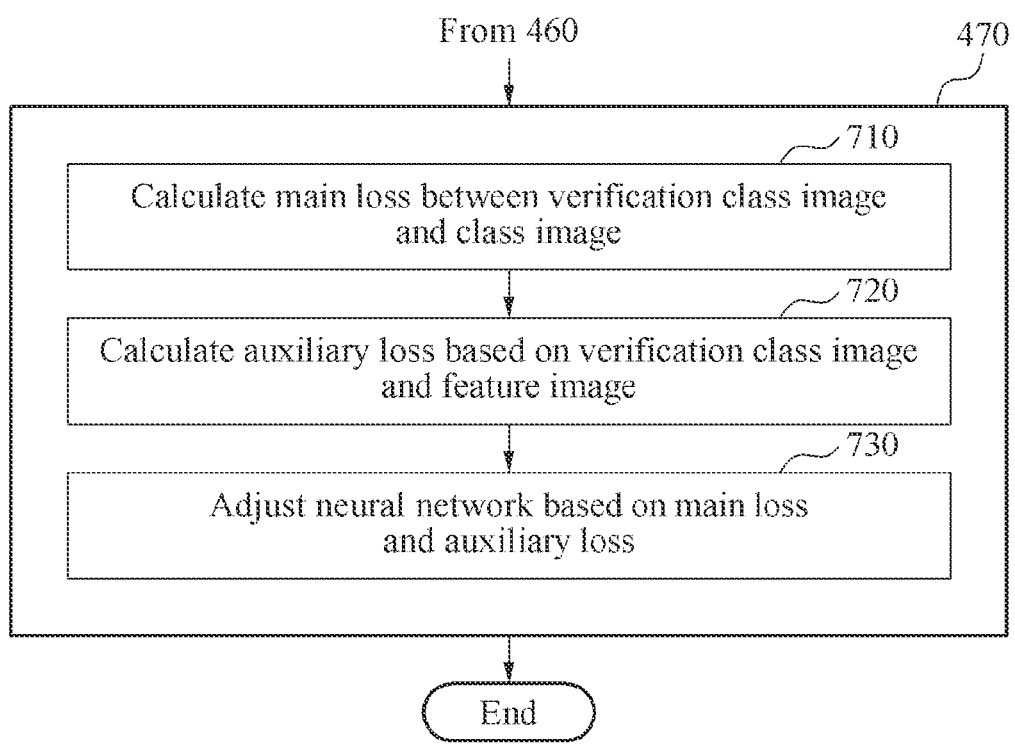
FIG. 7 is a flowchart illustrating an example of a method of adjusting a neural network, in accordance with one or more embodiments.

FIG. 7 is a flowchart illustrating an example of a method of adjusting a neural network, in accordance with one or more embodiments. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Operations 710 through 730 are included in operation 470 of FIG. 4.

Referring to FIG. 7, in operation 710, the neural network adjustment apparatus 300 calculates a main loss between the verification class image and the class image. In the case of adjusting the neural network by backpropagating only the main loss, a loss may not be efficiently delivered up to a convolutional network closer to an input end compared to the classification or feature vector due to a deep structure of the neural network. To enhance an efficiency of loss delivery, a method to directly provide a loss to a convolutional network may be used.

In operation 720, the neural network adjustment apparatus 300 calculates an auxiliary loss based on the verification class image and the feature image. The auxiliary loss is a loss to be directly provided to the convolutional network or convolutional portions of the entire neural network.

A size of the verification class image and a size of the feature image may not correspond to each other since the feature image is an image generated by the convolutional network. Also, the feature image is an image associated with a feature map, and the verification class image is an image in which the class is included. Thus, regions of information corresponding to images may not match. To calculate the auxiliary loss, a process of matching the regions between the images may be performed. The process will be described below with reference to FIGS. 8 through 11.

In operation 730, the neural network adjustment apparatus 300 adjusts the neural network based on the main loss and the auxiliary loss.

The losses may be backpropagated to deconvolutional layers, the fully connected layers 510, and convolutional layers using a backpropagation method. Connection weights in the deconvolutional layers, the fully connected layers 510, and the convolutional layers may be adjusted based on the backpropagated loss.

The neural network adjustment apparatus 300 backpropagates the main loss from an output end to the input end and backpropagates the auxiliary loss from the convolutional network to the input end. The neural network is adjusted to decrease the loss. For example, the neural network may be adjusted by changing weights of nodes that connect respective layers included in the convolutional network and the deconvolutional network and/or weights of the convolutional filter(s) and the deconvolution filter(s) may be adjusted.

Figure 8:
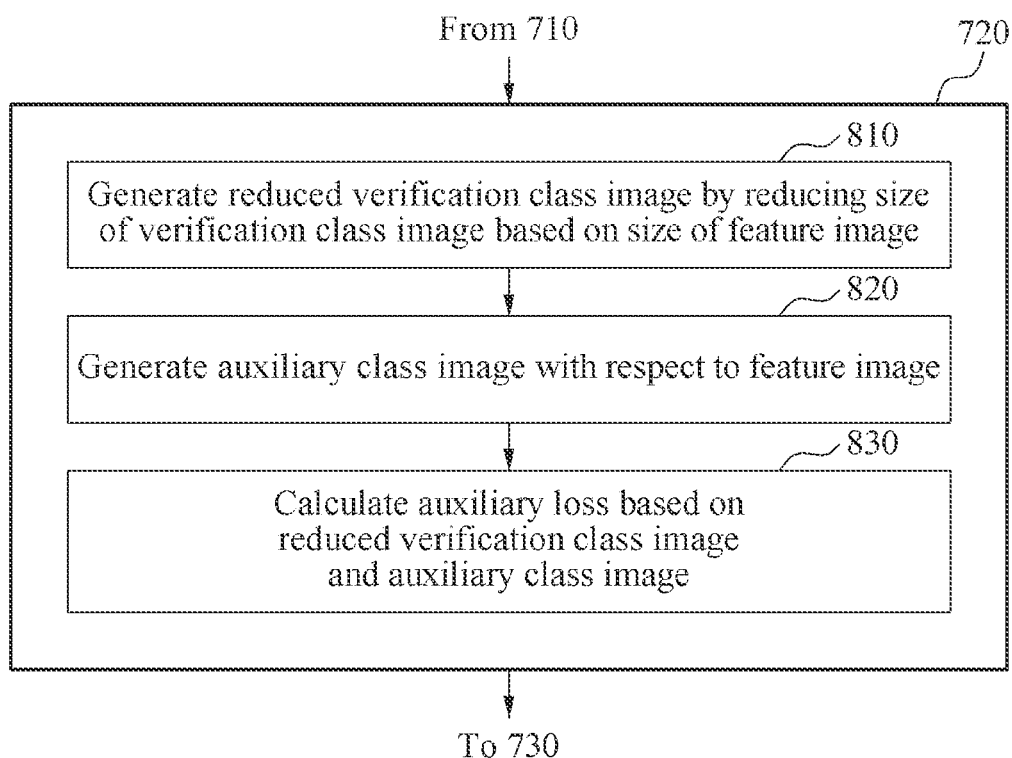
FIG. 8 is a flowchart illustrating an example of a method of calculating an auxiliary loss, in accordance with one or more embodiments.

FIG. 8 is a flowchart illustrating an example of a method of calculating an auxiliary loss. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Operations 810 through 830 may correspond to operation 720 of FIG. 7, for example.

Referring to FIG. 8, in operation 810, the neural network adjustment apparatus 300 generates a reduced verification class image by reducing the size of the verification class image based on the size of the feature image. The neural network adjustment apparatus 300 generates the reduced verification class image using a pooling or a sampling.

In an example, the size of the verification class image may be 720×480, and the size of the reduced verification class image may be 180×120. A single target pixel of the reduced verification class image may be determined using four pixels of the verification class image. For example, in response to four adjacent pixels forming a block, a pixel located at a left upper end of the block may be determined as the target pixel, which is a uniform sampling. As another example, a mode class among classes corresponding to the four pixels may be determined as a class of the target pixel. The mode class is the most frequently appeared class of appeared classes.

In operation 820, the neural network adjustment apparatus 300 generates an auxiliary class image with respect to the feature image. The feature image is an image associated with the feature map, and the reduced verification class image is an image in which the class is included. Thus, regions of information corresponding to images may not match. To match the regions, the auxiliary class image is generated using the feature image. For example, the feature image may be transformed to the auxiliary class image using a filter.

In operation 830, the neural network adjustment apparatus 300 calculates an auxiliary loss based on the reduced verification class image and the auxiliary class image.

Figure 9:
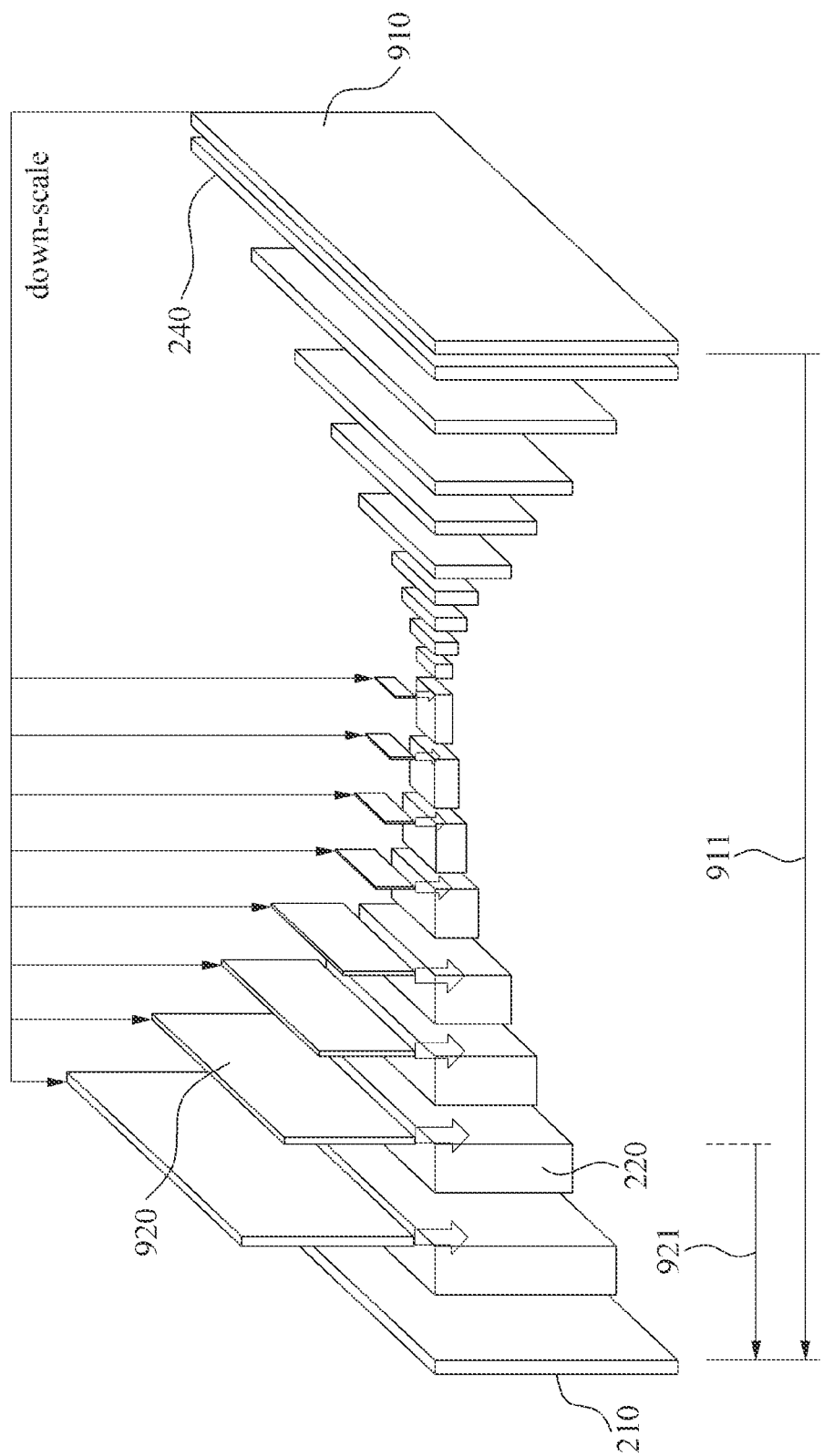
FIG. 9 illustrates an example of a method of adjusting a neural network based on a main loss and an auxiliary loss, in accordance with one or more embodiments.

FIG. 9 illustrates an example of a method of adjusting a neural network based on a main loss and an auxiliary loss.

A neural network generates the class image 240 based on the input image 210. A verification class image 910 is preset with respect to the input image 210. The verification class image 910 is an image in which a class of the input image 210 is expressed as a GT value. A difference between the verification class image 910 and the class image 240 is calculated as a main loss 911. A difference between auxiliary class images generated based on a reduced verification class image 920 and the feature image 220 is calculated as an auxiliary loss 921. A number of auxiliary losses 921 corresponds to a number of convolutional layers included in a convolutional network. The neural network is adjusted by backpropagating the main loss 911 and the auxiliary loss 921.

Figure 10:
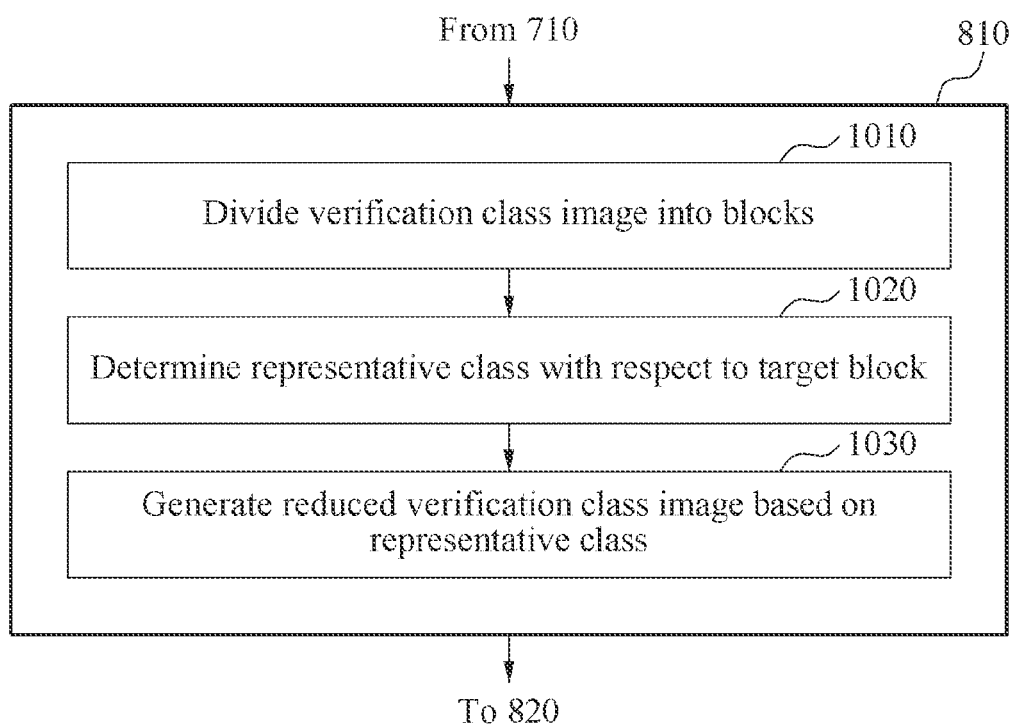
FIG. 10 is a flowchart illustrating an example of a method of generating a reduced verification class image, in accordance with one or more embodiments.

FIG. 10 is a flowchart illustrating an example of a method of generating a reduced verification class image, in accordance with one or more embodiments. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 10 below, the descriptions of FIGS. 1-9 are also applicable to FIG. 10, and are incorporated herein by reference. Thus, the above description may not be repeated here.

Operations 1010 through 1030 may correspond to operation 810 of FIG. 8, for example.

Referring to FIG. 10, in operation 1010, the neural network adjustment apparatus 300 divides the verification class image into a plurality of blocks each having a preset size. The size of the block changes based on the feature image. For example, in response to the size of the feature image decreasing, the size of the block increases.

In operation 1020, the neural network adjustment apparatus 300 determines a representative class of the target block. The mode class is determined among classes corresponding to pixels included in the target block, and the mode class in the target block is determined as the representative class.

In operation 1030, the neural network adjustment apparatus 300 generates the reduced verification class image based on the representative class.

FIG. 11 illustrates an example of a reduced verification class image.

Referring to FIG. 11, the verification class image 910 is divided into a plurality of blocks. For example, in response to a size of a reduced verification class image 1110 to be generated being 1/16 of a size of the verification class image 910, 16 pixels of the verification class image 910 are included in a single block.

A target block 1100 includes pixels corresponding to a first class 1101, pixels corresponding to a second class 1102, and pixels corresponding to a third class 1103. Since a largest number of pixels corresponds to the second class 1102, the second class 1102 is determined as a representative class.

A pixel 1111 of the reduced verification class image 1110 corresponding to the target block 1100 of the verification class image 910 is determined as the second class 1102.

Figure 12:
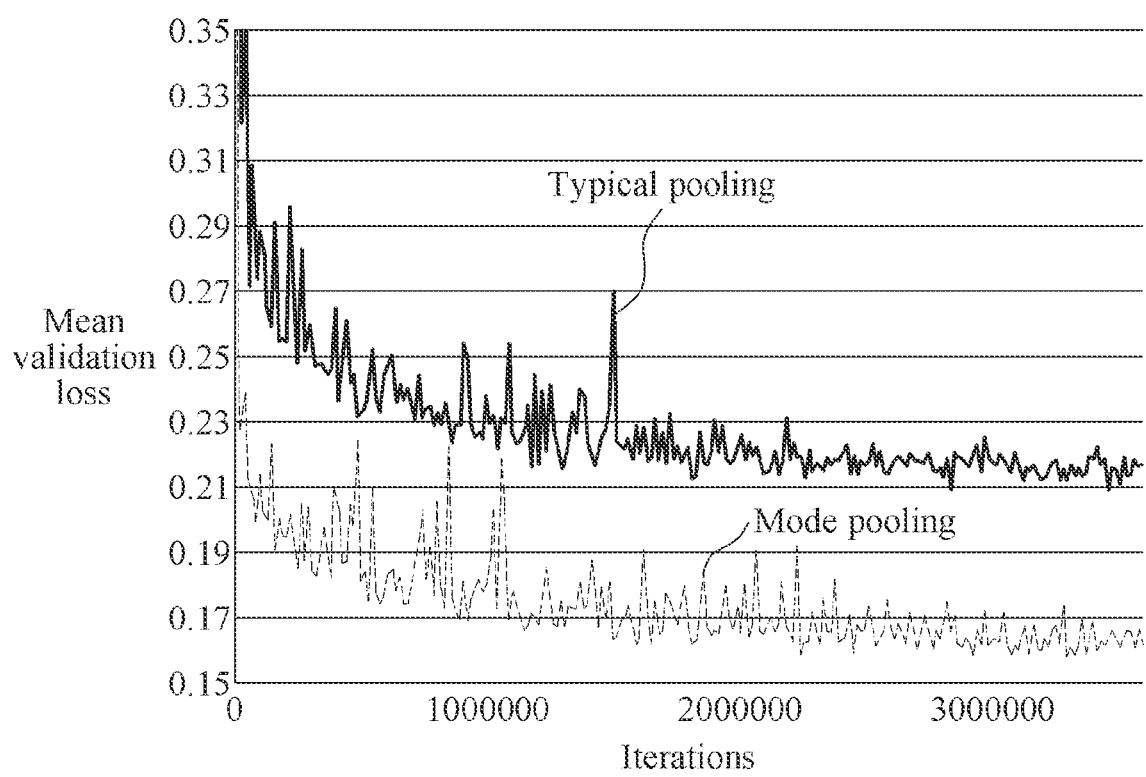
FIG. 12 is a graph showing an example of losses measured based on methods of adjusting a neural network, in accordance with one or more embodiments.

FIG. 12 is a graph showing an example of measured losses based on methods of adjusting a neural network.

Referring to the graph, a method of adjusting a neural network by generating a reduced verification class image using a mode pooling reduces a loss faster compared to a method of adjusting a neural network by generating a reduced verification image using a typical pooling, for example, a max pooling or a uniform sampling. The mode pooling selects most frequently appeared class or pixel value at each window, for example.

The processors, neural network adjustment apparatus 300, the communicator 310, the processor 320, the memory 330, and other apparatuses, devices, and other components described herein with respect to FIGS. 1-12 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIM D) multiprocessing, multiple-instruction single-data (MISD) multiprocessing, and multiple-instruction multiple-data (MIMD) multiprocessing.

The methods that perform the operations described with respect to FIGS. 1-12 are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations performed by the hardware components and the methods as described above. For example, the instructions or software include machine code that is directly executed by the one or more processors or computers, such as machine code produced by a compiler. As another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, as non-limiting blue-ray or optical disk storage examples, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network adjustment method comprising:
    generating a feature image by applying a input image to a convolutional network;
    determining at least one class corresponding to the feature image;
    generating a class image by applying the feature image to a deconvolutional network;
    calculating a loss of the class image based on a verification class image preset with respect to the input image; and
    adjusting a neural network based on the loss,
    wherein the adjusting of the neural network comprises:
        calculating a main loss between the verification class image and the class image;
        calculating an auxiliary loss based on a reduced verification class image of verification class image and auxiliary class image of the feature image, wherein the reduced verification class image is generated based on a mode class of a target block of a plurality of blocks of verification class image; and
        adjusting the neural network based on the calculated main loss and the calculated auxiliary loss.

2. The method of claim 1, wherein the neural network comprises the convolutional network and the deconvolutional network.

3. The method of claim 1, wherein the calculating of the auxiliary loss comprises:
    generating the reduced verification class image by reducing a size of the verification class image based on a size of the feature image;
    generating the auxiliary class image based on the feature image; and
    calculating the auxiliary loss based on the reduced verification class image and the auxiliary class image.

4. The method of claim 3, wherein the generating of the reduced verification class image comprises:
    dividing the verification class image into the plurality of blocks, each of the plurality of blocks having a preset size;
    determining a representative class of the target block; and
    generating the reduced verification class image based on the representative class.

5. The method of claim 4, wherein the determining of the representative class comprises determining the mode class in the target block as the representative class.

6. The method of claim 1, wherein, subsequent to a final operation of the neural network to generate a resulting trained neural network, the trained neural network is configured to process an image captured by a camera included in a vehicle to generate a final class image with a predetermined accuracy.

7. The method of claim 1, further comprising:
    stopping an adjustment of the neural network in response to the calculated loss being less than a preset threshold value.

8. A non-transitory computer-readable storage medium storing instructions that, when executed by a processor, cause the processor to perform the method of claim 1.

9. A neural network apparatus comprising:
    a processor; and
    a memory storing instructions that when implemented by the processor, the processor is configured to:
    generate a feature image by applying a convolutional network to a input image;
    determine at least one class corresponding to the feature image;
    generate a class image by applying a deconvolutional network to the feature image;
    calculate a loss of the class image based on a verification class image preset with respect to the input image; and
    adjust a neural network based on the loss,
    wherein the processor is configured to:
        calculate a main loss between the verification class image and the class image;
        calculate an auxiliary loss based on a reduced verification class image of verification class image and auxiliary class image of the feature image, wherein the reduced verification class image is generated based on a mode class of a target block of a plurality of blocks of verification class image; and
        adjust the neural network based on the calculated main loss and the calculated auxiliary loss.

10. The apparatus of claim 9, wherein the neural network includes the convolutional network and the deconvolutional network.

11. The apparatus of claim 9, wherein the processor is configured to:
- generate the reduced verification class image by reducing a size of the verification class image based on a size of the feature image;
- generate the auxiliary class image based on the feature image; and
- calculate the auxiliary loss based on the reduced verification class image and the auxiliary class image.

12. The apparatus of claim 11, wherein the processor is configured to:
- divide the verification class image into the plurality of blocks, each of the plurality of blocks having a preset size;
- determine a representative class of the target block; and
- generate the reduced verification class image based on the representative class.

13. The apparatus of claim 12, wherein the processor is configured to determine the mode class in the target block as the representative class.

14. The apparatus of claim 9, wherein the neural network is configured to process an image captured by a camera included in a vehicle.

15. The apparatus of claim 9, wherein the program is further configured to stop an adjustment of the neural network in response to the calculated loss being less than a preset threshold value.

16. The apparatus of claim 9, wherein the neural network apparatus is included in a server.

17. The apparatus of claim 9, wherein the neural network apparatus is included in a mobile device.

* * * * *